(12) United States Patent
Nelson et al.

(10) Patent No.: US 12,311,439 B2
(45) Date of Patent: May 27, 2025

(54) METAL MATRIX COMPOSITE SEAL USING DIRECTED ENERGY DEPOSITION

(71) Applicant: Rolls-Royce Corporation, Indianapolis, IN (US)

(72) Inventors: Scott Nelson, Indianapolis, IN (US); John Grubbs, Indianapolis, IN (US); Stephanie Gong, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/482,020

(22) Filed: Sep. 22, 2021

(65) Prior Publication Data

US 2022/0088679 A1 Mar. 24, 2022

Related U.S. Application Data

(60) Provisional application No. 63/082,043, filed on Sep. 23, 2020.

(51) Int. Cl.
| | |
|---|---|
| *B22F 10/25* | (2021.01) |
| *B22F 5/00* | (2006.01) |
| *B22F 7/06* | (2006.01) |
| *B22F 10/34* | (2021.01) |
| *B22F 12/70* | (2021.01) |
| *B33Y 10/00* | (2015.01) |
| *B33Y 30/00* | (2015.01) |
| *B33Y 70/00* | (2020.01) |

(52) U.S. Cl.
CPC .............. *B22F 10/25* (2021.01); *B22F 5/009* (2013.01); *B22F 7/062* (2013.01); *B22F 10/34* (2021.01); *B22F 12/70* (2021.01); *B33Y 10/00* (2014.12); *B33Y 30/00* (2014.12); *B33Y 70/00* (2014.12); *B22F 2007/068* (2013.01)

(58) Field of Classification Search
CPC .......... B22F 10/25; B22F 5/009; B22F 7/062; B22F 10/34; B22F 12/70; B22F 2007/068; B22F 12/55; B33Y 10/00; B33Y 30/00; B33Y 70/00
See application file for complete search history.

(56) References Cited

U.S. PATENT DOCUMENTS

| | | |
|---|---|---|
| 10,507,638 B2 | 12/2019 | Nuechterlein et al. |
| 10,954,803 B2 | 3/2021 | Shuck |
| 2016/0271878 A1 | 9/2016 | Nuechterlein et al. |
| 2017/0165910 A1* | 6/2017 | Dinardo ................. B33Y 10/00 |

(Continued)

OTHER PUBLICATIONS

Ahn, "Directed Energy Deposition (DED) Process: State of the Art", International Journal of Precision Engineering and Manufacturing—Green Technology, Feb. 15, 2021, p. 703-742, URL: https://link.springer.com/article/10.1007/S40684-020-00302-7.

(Continued)

*Primary Examiner* — Nicholas A Wang
*Assistant Examiner* — Maxwell Xavier Duffy
(74) *Attorney, Agent, or Firm* — Shumaker & Sieffert, P.A.

(57) ABSTRACT

A method may include controlling, by a computing device, an energy source to form a melt pool at a build surface; and controlling, by the computing device, a material delivery device to direct a powder at the melt pool to form the seal fin comprising a metal matrix composite on the build surface, wherein the metal matrix composite comprises a matrix material and a reinforcement phase.

7 Claims, 2 Drawing Sheets

(56) References Cited

U.S. PATENT DOCUMENTS

| | | | |
|---|---|---|---|
| 2017/0239892 A1* | 8/2017 | Buller | B28B 17/0081 |
| 2017/0246705 A1* | 8/2017 | Ribic | B23K 15/02 |
| 2018/0214949 A1* | 8/2018 | Martin | B22F 5/02 |
| 2020/0232109 A1* | 7/2020 | Hoffman | C23C 14/046 |
| 2020/0238386 A1* | 7/2020 | Sun | B33Y 50/02 |
| 2021/0179906 A1 | 6/2021 | Shuck | |

OTHER PUBLICATIONS

Borovkov et al., "In-Line Height Measurement Technique for Directed Energy Deposition Processes", Journal of Manufacturing and Materials Processing, vol. 5, No. 3, MDPI, Aug. 5, 2021, 18 pp., URL: https://www.mdpi.com/2504-4494/5/3/85.

Chen et al., "Multisensor fusion-based digital twin in additive manufacturing for in-situ quality monitoring and defect correction", International Conference on Engineering Design, vol. 3, Cambridge University, Jun. 19, 2023, pp. 2755-2764, URL: https://www.cambridge.org/core/journals/proceedings-of-the-design-society/article/multisensor-fusionbased-digital-twin-in-additive-manufacturing-for-insitu-quality-monitoring-and-defect-correction/28F31E5FE4274FEE5C87F156A79A7F2D.

Haley et al., "In-situ digital image correlation and thermal monitoring in directed energy deposition additive manufacturing", Optics Express, vol. 29, No. 7, Mar. 29, 2021, pp. 9927-9941, URL: https://opg.optica.org/oe/fulltext.cfm?uri=oe-29-7-9927.

Haley et al., "Review of Advanced Manufacturing Techniques and Qualification Processes for Light Water Reactors Laser-Directed Energy Deposition Additive Manufacturing", Oak Ridge National Laboratory, Sep. 2021, 84 pp., Retrieved from the Internet on Feb. 6, 2024 from URL: https://www.nrc.gov/docs/ML2129/ML21292A187.pdf.

Jacobsmuhlen et al., "Image-based Methods for Inspection of Laser Beam Melting Processes", Rwthaachen University, May 16, 2018, 215 pp., URL: https://publications.rwth-aachen.de/record/760489/files/760489.pdf.

Jing et al., "Numerical Studies of the Effects of the Substrate Structure on the Residual Stress in Laser Directed Energy Additive Manufacturing of Thin-Walled Products", Metals, vol. 12, No. 3, MDPI, Mar. 9, 2022, 16 pp., URL: https://www.mdpi.com/2075-4701/12/3/462.

Lee et al., "Characterization of Surface Topography Features for the Effect of Process Parameters and Their Correlation to Quality Monitoring in Metal Additive Manufacturing", Metrology, vol. 2, No. 1, MDPI, Feb. 7, 2022, p. 73-83, URL: https://www.mdpi.com/2673-8244/2/1/5.

Lim et al., "Selection of effective manufacturing conditions for directed energy deposition process using machine learning methods", Scientific Reports, vol. 11, No. 1, Dec. 17, 2021, 13 pp., URL: https://www.nature.com/articles/s41598-021-03622-z.

Marko et al., "Quality Prediction in Directed Energy Deposition Using Artificial Neural Networks Based on Process Signals", Applied Science, vol. 12, No. 8, MDPI, Apr. 14, 2022, 13 pp., URL: https://www.mdpi.com/2076-3417/12/8/3955.

Pandiyan et al., "In situ quality monitoring in direct energy deposition process using co-axial process zone imaging and deep contrastive learning", Journal of Manufacturing Processes, vol. 81, Elsevier Ltd, Sep. 1, 2022, pp. 1064-1075, URL:https://www.sciencedirect.com/science/article/pii/S1526612522004996.

Prakash et al., "Digitalization of directed energy deposition process through a multidirectional height monitoring sensor system", Journal of Laser Application, vol. 33, No. 1, Jan. 22, 2021, 8 pp., URL: https://pubs.aip.org/lia/jla/article/33/1/012044/990244.

Russell, "Directed Energy Deposition Flow Control for High Speed Intake Applications", University of Glasgow, Apr. 7, 2020, 221 pp., URL:https://theses.gla.ac.uk/81274/1/2020RussellPhD.pdf.

Vykhtar et al., "Optical monitoring sensor system for laser-based directed energy deposition", Lasers in Manufacturing Conference, Jun. 21, 2021, 8 pp., URL: https://wlt.de/sites/default/files/2021-10/directed_energy_deposition/Contribution_227_final.pdf.

Zhao et al., "A thermal multi-phase flow model for directed energy deposition processes via a moving signed distance function", Computer Methods in Applied Mechanics and Engineering, vol. 373, No. 113518, Elsevier B.V., Nov. 11, 2020, 15 pp., URL: https://yan.cee.illinois.edu/files/2021/08/DED.pdf.

* cited by examiner

METAL MATRIX COMPOSITE SEAL USING DIRECTED ENERGY DEPOSITION

This application claims the benefit of U.S. Provisional Application Ser. No. 63/082,043, entitled "METAL MATRIX COMPOSITE SEAL USING DIRECTED ENERGY DEPOSITION, filed on Sep. 23, 2020, the entire content of which is incorporated herein by reference.

TECHNICAL FIELD

The present disclosure generally relates to seals for rotating components.

BACKGROUND

Seals between rotating components and an adjacent static (non-rotating) component can increase efficiency of an engine, such as a gas turbine engine. For example, seal fins or blade seals may be used to seal between rotors in the compressor or turbine of the gas turbine engine and adjacent static components. Due to the high temperatures experienced by the seal, the seal fin or blade seal may be formed from a high temperature alloy or ceramic, and may contact a honeycomb structure or abradable coatings to form the seal. Over time, the seal fin or blade seal may experience wear or damage due to contact with the honeycomb structure, abradable coating, or substrate underlying the honeycomb structure or abradable coating.

SUMMARY

In some examples, the disclosure describes a method for forming a seal fin. The method includes controlling, by a computing device, an energy delivery device to form a melt pool at a build surface; and controlling, by the computing device, a material delivery device to direct a powder at the melt pool to form the seal fin comprising a metal matrix composite on the build surface, wherein the metal matrix composite comprises a matrix material and a reinforcement phase.

In some examples, the disclosure described a directed energy deposition material addition (DED MA) system including a material delivery device, an energy delivery device, and a computing device. The computing device is configured to control the energy delivery device to form a melt pool at a build surface; and control the material delivery device to direct a powder at the melt pool to form the seal fin comprising a metal matrix composite on the build surface, wherein the metal matrix composite comprises a matrix material and a reinforcement phase.

In some examples, the disclosure describes a computer-readable storage medium including instructions, that, when executed, cause at least one processor to control an energy delivery device to form a melt pool at a build surface; and control a material delivery device to direct a powder at the melt pool to form the seal fin comprising a metal matrix composite on the build surface, wherein the metal matrix composite comprises a matrix material and a reinforcement phase The details of one or more examples are set forth in the accompanying drawings and the description below. Other features, objects, and advantages will be apparent from the description and drawings, and from the claims.

DETAILED DESCRIPTION

Figure 1:
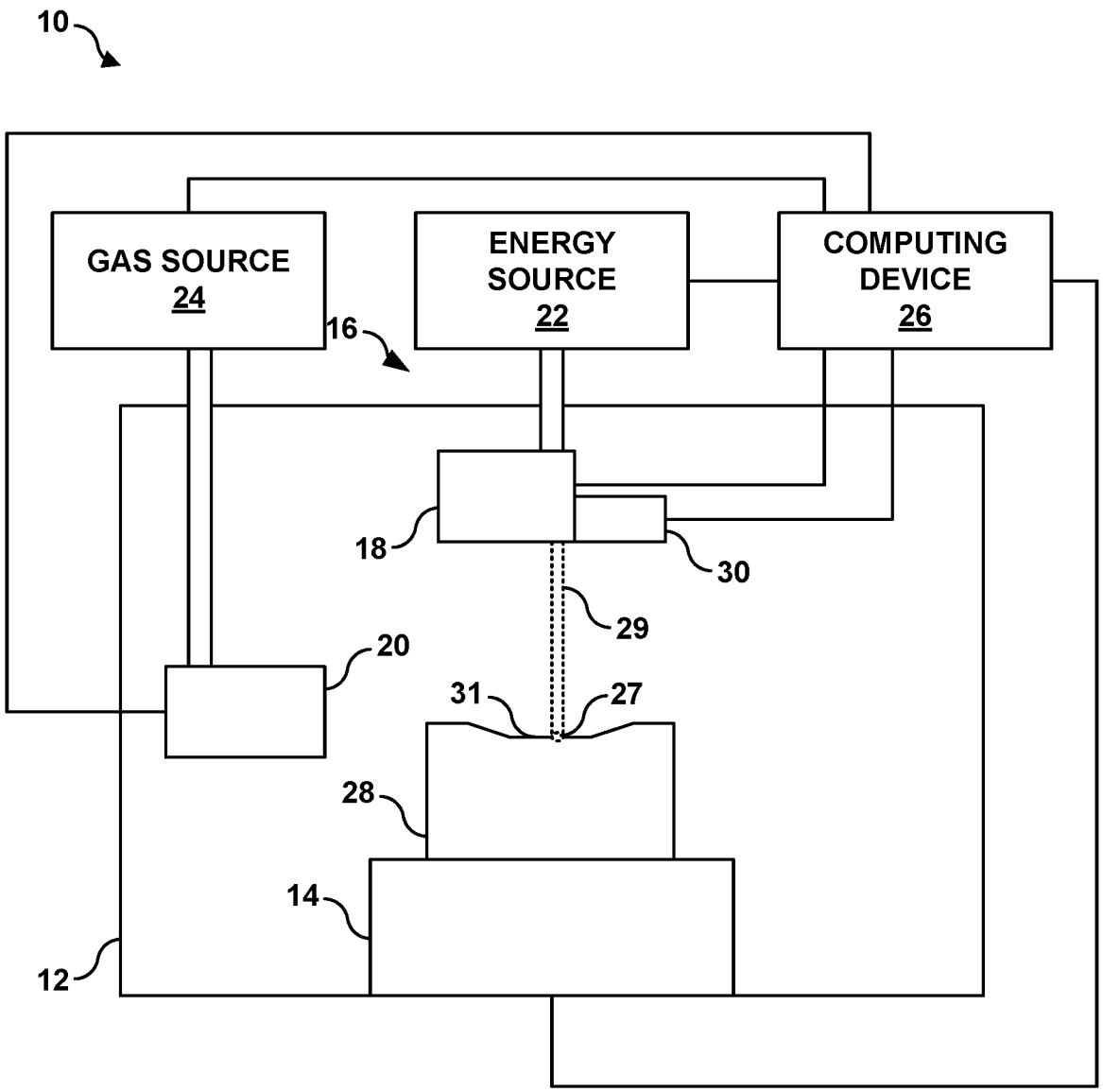
FIG. 1 is a conceptual block diagram illustrating an example system for forming or repairing seal fin including a metal matrix composite using directed energy deposition (DED) material addition (MA).

The disclosure describes systems and techniques for controlling forming a seal fin (also referred to as a blade seal) including a metal matrix composite using a directed energy deposit (DED) material addition (MA) technique. Seal fins cooperate with a coating or structure on an adjacent component to form a seal, e.g., between a rotating component and an adjacent stationary component. For example, the adjacent component may include a honeycomb structure or an abradable coating that is configured to be abraded by the seal fin.

Over time, the seal fin may be damaged, e.g., due to contact with the abradable coating or honeycomb structure, creep of the seal fin, contact with the substrate underlying the abradable coating or honeycomb structure, or the like. As such, the seal fin may be repaired or replaced from time to time, and could benefit from more resilient materials.

A metal matrix composite includes a metal or alloy matrix and a second phase within the metal or alloy matrix. The second phase may include an intermetallic or ceramic material. A metal matrix composite may increase wear resistance, temperature capability, and/or strength of the seal fin compared to an alloy material from which a seal fin may otherwise be formed.

The metal matrix composite may be deposited using a DED MA technique. This may allow the metal matrix composite on build surfaces that are non-planar, e.g., are curved in at least one dimension. This may be beneficial when forming seal fins, which may be formed on build surfaces that are curved due to the radius of curvature of a gas turbine engine in which the seal fin is used. Further, DED MA may be relatively economical and fast compared to other build or repair techniques.

The metal matrix composite seal fin may be a new seal fin or a repair seal fin. In other words, DED MA may be used to manufacture a new seal fin or to repair an existing seal fin.

For instance, a DED MA system may include a computing device, a material delivery device, and an energy delivery device. The computing device may be configured to control the energy delivery device to form a melt pool at a build surface; and control the material delivery device to direct a powder at the melt pool to form the seal fin comprising a metal matrix composite on the build surface. The metal matrix composite comprises a matrix material and a reinforcement phase.

In some examples, the powder may include a first material and a second material. The first material and the second material may react to form the metal matrix composite. For instance, some of the first material may react with the second material to form the reinforcement phase within a matrix of the first material.

In some examples, the powder may include a first material, and the DED MA system may further include a gas source. The computing device may be configured to control the gas source to provide a second material in a gaseous phase to the melt pool. The first material and the second material react to form the metal matrix composite. For instance, some of the first material may react with the second material to form the reinforcement phase within a matrix of the first material.

In some examples, the powder includes a first powder comprising an alloy and a second powder comprising a ceramic. The first powder may constitute the matrix material and the ceramic may constitute the reinforcement phase.

In some examples, the DED MA may include two material delivery devices. The first material delivery device may deliver a first powder comprising an alloy to the melt pool, and the second material delivery device may be configured to direct a second powder comprising a ceramic at the melt pool, wherein the second material comprises a ceramic.

In some examples, the metal matrix composite comprises a matrix material including at least one of titanium, a titanium alloy, nickel, a nickel alloy, cobalt, or a cobalt alloy.

In some examples, the metal matrix composite comprises a reinforcement phase including at least one of carbon, a nitride, alumina, zirconia, or hafnia.

In some examples, the metal matrix composite comprises between about 2 volume percent and about 10 volume percent of the reinforcement phase.

In some examples, in a repair process, prior to depositing the metal matrix composite, a damaged portion of an existing seal fin may be removed to define the build surface; and the build surface may be prepared. Preparing the repair surface may include etching the build surface to remove surface impurities.

FIG. 1 is a conceptual diagram illustrating an example system 10 for forming or repairing a seal fin including a metal matrix composite using DED MA. The example system 10 illustrated in FIG. 1 includes an enclosure 12, which encloses a stage 14, an energy delivery device 16 (which includes energy source 22 and energy delivery head 18), a gas delivery device 20, and a material delivery device 30. System 10 also includes a gas source 24, which is fluidly connected to gas delivery device 20. In the example of FIG. 1, system 10 further includes a computing device 26, which is communicatively connected to energy source 22, gas source 24, gas delivery device 20, energy delivery head 18, stage 14, and material delivery device 30.

In some examples, component 28 may include a component of a gas turbine engine. For example, component 28 may include a part that forms a portion of a flow path structure or another portion of the gas turbine engine. For example, component 28 may include compressor blade or a turbine blade that includes a seal fin another rotating component that includes a blade seal. In other examples, component 28 can take on a variety of other forms.

Component 28 may be formed of materials including metals and alloys, alone, or with one or more metallic, alloy, or ceramic coatings. In some examples, component 28 may include a titanium alloy, a nickel alloy, or a cobalt alloy. Example alloys include Ti-6Al-4V; Ti-6Al-2Sn-4Zr-2Mo; Ti-6Al-2Sn-4Zn-6Mo; Inconel 718, an alloy including about (by mass) 50-55% Ni, about 17-21% Cr, about 2.8-3.3% Mo, about 4.75-5.5% Nb, about 1% Co, about 0.35% Mn, about 0.2-0.8% Cu, about 0.65-1.15% Al, about 0.3% Ti, about 0.35% Si, about 0.08% C, about 0.015% S, about 0.015% P, about 0.006% B, and a balance Fe; Inconel 792, an alloy including about (by mass) about 3.2% Al, about 0.02% B, about 0.21% C, about 12.7% Cr, about 9% Co, about 3.9% Ta, about 4.2% Ti, about 3.9% W, about 0.1% Zr, and a balance Ni; Inconel 625, an alloy including (by weight) between about 20 and about 23% Cr, a maximum of about 5% Fe, between about 8% and about 10% Mo, between about 3.15% and about 4.15% Nb and Ta, less than about 0.01% C, less than about 0.5% Mn, less than about 0.5% Si, less than about 0.015% P, less than about 0.015% S, less than about 0.4% Al, less than about 0.4% Ti, less than about 1% Co, and a balance Ni; CMSX-4, an alloy including (by weight) about 6.5% Cr, about 9% Co, about 6% W, about 0.6% Mo, about 6.5% Ta, about 5% Re, about 5.^% Al, about 1% Ti, about 0.1% Hf, and a balance Ni; Rene 80, an alloy including (by weight) about 14% Cr, about 9.5% Co, about 4% Mo, about 3% Al, about 5% Ti, about 4% W, about 0.03% Zr, about 0.16% C, about 0.015% B, and a balance Ni; L605, an alloy including (by weight) about 20% Cr, about 15% W, about 10% Ni, less than 3% Fe, about 1.5% Mn, less than 0.4% Si, about 0.1% C, less than about 0.03% S, less than about 0.04% P, and a balance Co; or the like.

Enclosure 12 may substantially enclose (e.g., enclose or nearly enclose) stage 14, energy delivery head 18, gas delivery device 20, component 28, and material delivery device 30. In some examples, enclosure 12 may contain a substantially inert atmosphere (e.g., helium, argon, or the like) during operation of system 10.

In some examples, stage 14 may be configured to selectively position and restrain component 28 in place relative to stage 14 during formation or repair of component 28. In some examples, stage 14 is movable relative to energy delivery head 18, gas delivery device 20, and/or material delivery device 30. For example, stage 14 may be translatable and/or rotatable along at least one axis (e.g., using a 5-axis motion system) to position component 28 relative to energy delivery head 18, and/or gas delivery device 20. Similarly, in some examples, at least one of energy delivery head 18 or gas delivery device 20 may be movable relative to stage 14 to position the at least one of energy delivery head 18 and/or gas delivery device 20 relative to component 28. In some examples, as illustrated in FIG. 1, energy delivery head 18 may be coupled (e.g., mechanically attached) to material delivery device 30, such that positioning energy delivery head 18 relative to stage 14 also positions material delivery device 30 relative to stage 14.

Energy source 22 may include, for example, a laser source, such as a CO laser, a $CO_2$ laser, a Nd:YAG laser, or the like. Energy source 22 may be selected to provide energy with a predetermined wavelength or wavelength spectrum that may be absorbed by the material to be added to component 28 during DED MA formation or repair of component 28. Energy source 22 may be operatively connected to energy delivery head 18, which aims an energy beam 29 toward build surface 31 of component 28 during formation or repair of component 28. As described above, in some examples, energy delivery head 18 may be movable in at least one dimension (e.g., translatable and/or rotatable) under control of computing device 26 to direct the focal spot 27 of energy beam 29 toward a selected location of component 28, forming a melt pool at focal spot 27. In some examples, the movement of energy delivery head 18 and/or stage 14 may also control the angle of energy beam 29 relative to build surface 31.

Computing device 26 may control at least one of the power level of energy source 22, the focal spot size of the energy beam delivered adjacent to build surface 31 of component 28, the relative movement of the focal spot 27 of the energy beam 29 (and thus the melt pool) relative to component 28, a pause time between bursts of energy, the standoff between the focal point and build surface 31 of component 28, the angle of energy beam 29 relative to build surface 31, or tool path. The tool path may include the width of the overlap between adjacent passes of the energy beam focal spot and the build-up rate. Computing device 26 may control the at least one of these parameters to control the amount of material added to component 28 at a given time and/or to control metallurgical properties of the added material. In some examples, energy delivery head 18 may be scanned (e.g., translated) relative to build surface 31 of component 28 being repaired to scan the focal spot relative to build surface 31 of component 28 being repaired, and the material may be fused in a general shape corresponding to the scanned path of the focal spot.

System 10 also includes gas source 24. In some examples, gas source 24 may include, for example, a source of helium, argon, or other substantially inert gas. In some examples, the gas may function as a cooling gas, which cools a portion of component 28 by flowing past the portion of component 28. As used herein, a substantially inert gas may include a gas that does not react with component 28 or the material being added to component 28 during the DED MA forming or repair process.

In other examples, gas source 24 may include, for example, a source of a reactive gas, e.g., a source of a gas configured to react with the material delivered to the melt pool at focal spot 27 to form a reinforcement phase within the metal matrix composite. Reactive gases include, for example, nitrogen, oxygen, carbon, and combinations thereof. In some examples, gas source 24 may provide a mixture of two or more gases, e.g., a mixture of one or more substantially inert gases and one or more reactive gases.

Gas source 24 is fluidically coupled to gas delivery device 20. Although FIG. 1 illustrates system 10 including a single gas delivery device 20, in other examples, system 10 may include at least one gas delivery device 20, such as a plurality of gas delivery devices. Gas source 24 may be fluidically coupled to gas delivery device 20 using a tube, pipe, conduit, or the like, that allows fluid communication between gas source 24 and gas delivery device 20.

As described above, in some examples, gas delivery device 20 may be movable relative to component 28 under control of computing device 26. This may allow computing device 26 to control delivery of one or more gases to a selected portion of component 28 to achieve controlled cooling of the selected portion of component 28 and/or provide a reactive gas to the melt pool. In examples in which system 10 includes a plurality of gas delivery devices 20, each device 20 may be independently controllable by computing device 26 to independently cool selected portions of component 28 and/or deliver a reactive gas to the melt pool.

System 10 also may include a material delivery device 30. Material delivery device 30 may be configured to deliver material to the location of component 28 being formed or repaired. For instance, the material may be delivered to the melt pool formed at and/or adjacent to focal point 27. The material may be heated by energy delivered by energy delivery head 18 and/or the melt pool to add the material to component 28. In some examples, the material may be supplied by material delivery device 30 in powder form. In some examples, the material to be delivered by material delivery device 30 to the melt pool may include a composition substantially the same as (e.g., the same or nearly the same as) the composition of the material from which component 28 is formed. In other examples, the material to be delivered by material delivery device 30 to the melt pool may include a composition different from the composition of the material from which component 28 is formed.

As illustrated in FIG. 1, in some examples, material delivery device 30 may be mechanically attached to or integrated into energy delivery head 18. In some examples, this may facilitate coordinated positioning of energy delivery head 16 relative to the location at which material is delivered. In other examples, material delivery device 30 may be separate from energy delivery head 16.

Material delivery device 30 may deliver the material in powder form. For example, material in powder form may be blown by material delivery device 30 to deliver the material adjacent to the melt pool. Initially, material delivery device 30 may be positioned and configured to deliver material adjacent to the melt pool. Computing device 26 also may control the rate at which material is delivered by material delivery device 30 adjacent to the melt pool.

The material delivered by material delivery device 30 may include a first material and optionally one or more additional materials. The first material may be selected to form the matrix of the metal matrix composite. In some examples, the first material may be selected to be the same as the material of component 28 on which the seal fin is formed. For example, the first material may include a titanium alloy, a nickel alloy, or a cobalt alloy. Example alloys include Ti-6Al-4V; Ti-6Al-2Sn-4Zr-2Mo; Ti-6Al-2Sn-4Zn-6Mo; Inconel 718, an alloy including about (by mass) 50-55% Ni, about 17-21% Cr, about 2.8-3.3% Mo, about 4.75-5.5% Nb, about 1% Co, about 0.35% Mn, about 0.2-0.8% Cu, about 0.65-1.15% Al, about 0.3% Ti, about 0.35% Si, about 0.08% C, about 0.015% S, about 0.015% P, about 0.006% B, and a balance Fe; Inconel 792, an alloy including about (by mass) about 3.2% Al, about 0.02% B, about 0.21% C, about 12.7% Cr, about 9% Co, about 3.9% Ta, about 4.2% Ti, about 3.9% W, about 0.1% Zr, and a balance Ni; Inconel 625, an alloy including (by weight) between about 20 and about 23% Cr, a maximum of about 5% Fe, between about 8% and about 10% Mo, between about 3.15% and about 4.15% Nb and Ta, less than about 0.01% C, less than about 0.5% Mn, less than about 0.5% Si, less than about 0.015% P, less than about 0.015% S, less than about 0.4% Al, less than about 0.4% Ti, less than about 1% Co, and a balance Ni; CMSX-4, an alloy including (by weight) about 6.5% Cr, about 9% Co, about 6% W, about 0.6% Mo, about 6.5% Ta, about 5% Re, about 5.˚% Al, about 1% Ti, about 0.1% Hf, and a balance Ni; Rene 80, an alloy including (by weight) about 14% Cr, about 9.5% Co, about 4% Mo, about 3% Al, about 5% Ti, about 4% W, about 0.03% Zr, about 0.16% C, about 0.015% B, and a balance Ni; L605, an alloy including (by weight) about 20% Cr, about 15% W, about 10% Ni, less than 3% Fe, about 1.5% Mn, less than 0.4% Si, about 0.1% C, less than about 0.03% S, less than about 0.04% P, and a balance Co; or the like.

In some examples, the material delivered by material delivery device 30 may include a second material. The second material may form the reinforcement phase of the metal matrix composite. For instance, the second material may include carbon, a nitride (e.g., titanium nitride, silicon nitride, or the like), a carbide (e.g., titanium carbide, silicon carbide, tungsten carbide, boron carbide, or the like), alumina, silica, hafnia, zirconia, or the like. In other examples, the second material may react with a component of the first material to form the reinforcement phase. For example, the second material may include titanium, carbon, boron, boron carbide ($B_4C$), silicon, tungsten, nickel, molybdenum, aluminum, titanium oxide, boron oxide, selenium, iron II oxide ($Fe_2O_3$), calcium oxide, phosphate oxide ($P_2O_5$), titanium carbide, or the like. The second material may react with a component of the first material to form a reinforcement phase including, for example, titanium carbide titanium boride, silicon carbide, tungsten carbide, boron carbide, nickel titanium, molybdenum silicide, alumina, molybdenum selenide, calcium phosphate ($Ca_3(PO_4)_2$), or the like.

The first and second materials, when present, may be delivered as part of mixed powder, as two separate powders (e.g., from two different powder delivery devices), or the like.

In other examples, the material delivered by material delivery device 30 may include a first material that forms the metal matrix, and second and third materials that react in the melt pool to form the reinforcement phase. The second and third materials may be selected from any of the reactive materials described above, e.g., titanium, carbon, boron, boron carbide ($B_4C$), silicon, tungsten, nickel, molybdenum, aluminum, titanium oxide, boron oxide, selenium, iron II oxide ($Fe_2O_3$), calcium oxide, phosphate oxide ($P_2O_5$), titanium carbide, or the like.

In examples in which the material delivered by material delivery device 30 includes a reactive material, the amount of reactive material may be selected based on a desired final amount of reinforcement phase and stoichiometry of the reaction that forms the reinforcement phase.

Computing device 26 may include, for example, a desktop computer, a laptop computer, a workstation, a server, a mainframe, a cloud computing system, or the like. Computing device 26 may include or may be one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality of computing device 26 may be provided within dedicated hardware and/or software modules.

Computing device 26 is configured to control operation of system 10, including, for example, stage 14, gas delivery device 20, gas source 24, energy source 22, energy delivery head 18, and/or material delivery device 30. Computing device 26 may be communicatively coupled to at least one of stage 14, gas delivery device 20, gas source 24, energy source 22, energy delivery head 18, and/or material delivery device 30 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Computing device 26 may be configured to control operation of stage 14, energy delivery head 18, and/or gas delivery device 20 to position component 28 relative to energy delivery head 18 and/or gas delivery device 20. For example, as described above, computing device 26 may control stage 14, energy delivery head 18, and/or gas delivery device 20 to translate and/or rotate along at least one axis to position component 28 relative to energy delivery head 18 and/or gas delivery device 20. Positioning component 28 relative to energy delivery head 18 and/or gas delivery device 20 may include positioning a predetermined surface (e.g., a surface to which material is to be added) of component 28 in a predetermined orientation relative to energy delivery head 18 and/or gas delivery device 20.

Figure 2:
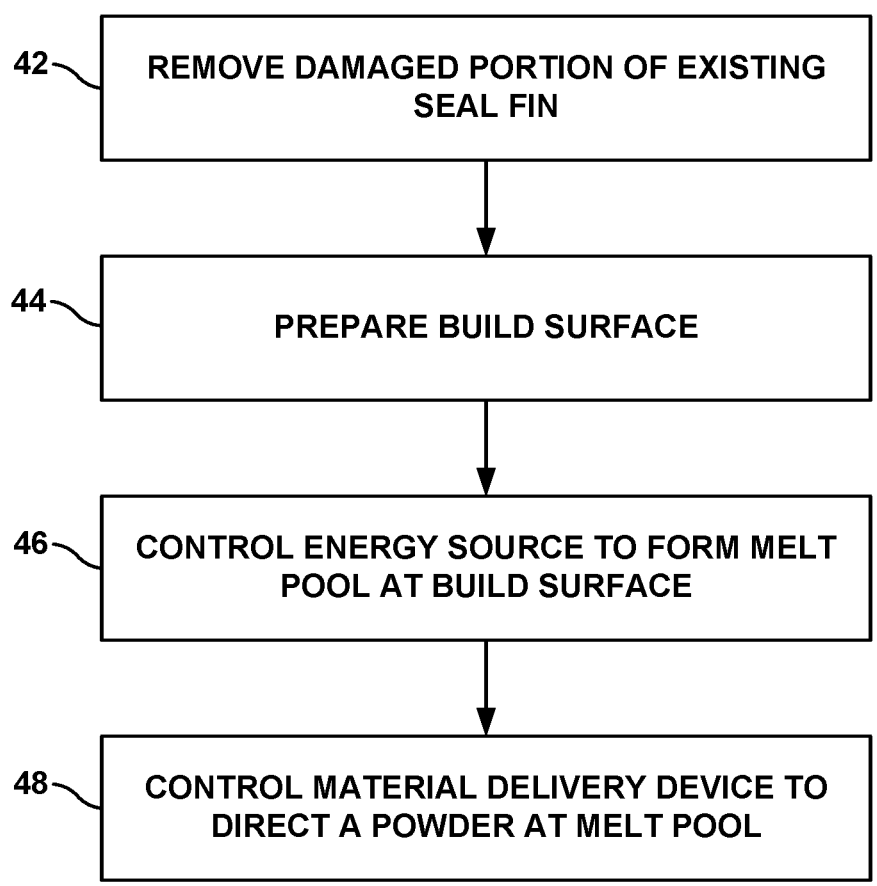
FIG. 2 is a flow diagram illustrating an example technique for forming a seal fin including a metal matrix composite using directed energy deposit (DED) material addition (MA).

In accordance with some examples of this disclosure, computing device 26 may be configured to implement a method as shown in FIG. 2. The method of FIG. 2 optionally includes removing a damaged portion of an existing seal fin (42). This step may be performed in examples in which the metal matrix composite is used to repair an existing seal fin.

As described above, the existing seal fin may experience wear or damage due to contact with an adjacent honeycomb structure, abradable coating, or substrate underlying the honeycomb structure or abradable coating. The damaged portion of the existing seal fin may be removed using any suitable technique, including, for example, mechanical, chemical etching, chemical mechanical polishing, or the like. In some examples, around 50 thousandths of an inch (about 1.27 mm) of the damaged portion of the existing seal fin may be removed.

In some examples, the surface of the existing seal fin then may be prepared to define a build surface (44). For instance, the surface may be polished, etched, or the like, to form a desired surface roughness and/or remove impurities from the build surface. As an example, an exposed titanium surface may oxidize and develop a thin titanium oxide coating, which may be removed by etching to define the build surface (44).

Once the build surface is prepared (whether from a damaged existing seal fin or during initial manufacture of a new seal fin), computing device 26 may control energy delivery device 16, including energy source 22 and energy delivery head 18, to form a melt pool at build surface 31 (46). As described above, computing device 26 may control at least one of the power level of energy source 22, the focal spot size of the energy beam 29 delivered to build surface 31 of component 28, the relative movement of the focal spot 27 of the energy beam 29 (and thus the melt pool) relative to component 28, a pause time between bursts of energy, the standoff between the focal point and build surface 31 of component 28, the angle of energy beam 29 relative to build surface 31, or tool path. The tool path may include the width of the overlap between adjacent passes of the energy beam focal spot and the build-up rate. Computing device 26 may control the at least one of these parameters to control the size of the melt pool, the amount of material added to component 28 at a given time, and/or to control metallurgical properties of the added material. In some examples, computing device 26 may cause energy delivery head 18 to be scanned (e.g., translated) relative to build surface 31 of component 28 being manufactured or repaired to scan the focal spot and melt pool relative to build surface 31 of component 28, and the material may be fused in a general shape corresponding to the scanned path of the focal spot.

Computing device 26 also may control material delivery device 30 to direct a powder at the melt pool to form the seal fin comprising a metal matrix composite on build surface 31 (48). The metal matrix composite includes a matrix material and a reinforcement phase. The powder may include any of the materials described above.

In some examples, system 10 may include two or more material delivery devices, and each material delivery device may be configured to deliver a respective material to the melt pool. Computing device 26 may be configured to control the material delivery devices to deliver the respective materials at selected times to selected positions in selected amounts to control formation of the metal matrix composite seal fin.

In some examples, a reactive gas may be delivered to the melt pool. The reactive gas may be selected and configured to react with a component of the material delivered to the melt pool to form the reinforcement phase of the metal matrix composite. In such examples, computing device 26 may be configured to control gas delivery device 20 to deliver the reactive gas, either alone or mixed with an inert gas, to the melt pool at selected times to selected positions in selected amounts to control formation of the metal matrix composite seal fin.

In one or more examples, the functions described herein may be implemented in hardware, software, firmware, or any combination thereof. If implemented in software, the functions may be stored on or transmitted over, as one or more instructions or code, a computer-readable medium or computer-readable storage device and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media or computer-readable storage device, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for forming a seal fin, the method comprising:
controlling, by a computing device, an energy delivery device to form a melt pool at a build surface; and
controlling, by the computing device, a material delivery device to direct a first powder and a second powder at the melt pool to form the seal fin comprising a metal matrix composite on the build surface, wherein the first powder is different than the second powder, and wherein the metal matrix composite comprises a matrix material and a reinforcement phase within the matrix material, wherein the first powder comprises a nickel alloy that forms the matrix material of the metal matrix composite, wherein a portion of the nickel alloy and the second powder react to form the reinforcement phase within the nickel alloy matrix material, wherein the reinforcement phase formed by the reaction of the portion of the nickel alloy with the second powder comprises boron carbide, and wherein the reinforcement phase formed by the reaction of the portion of the nickel alloy with the second powder is between about 2 volume percent and about 10 volume percent of the metal matrix composite.

2. The method of claim 1, wherein the reinforcement phase comprises an intermetallic.

3. The method of claim 1, wherein the second powder comprises at least one of carbon, a nitride, a carbide, alumina, silica, hafnia, or zirconia.

4. The method of claim 1, wherein the second material comprises at least one of titanium, carbon, boron, boron carbide, silicon, tungsten, nickel, molybdenum, aluminum, titanium oxide, boron oxide, selenium, iron II oxide, calcium oxide, phosphate oxide, or titanium carbide.

5. The method of claim 1, wherein the method comprises a repair method, further comprising, prior to forming the melt pool and directing the first powder and second powder at the melt pool:
removing a damaged portion of an existing seal fin to define the build surface; and
preparing the build surface.

6. The method of claim 5, wherein preparing the repair surface comprises etching the build surface to remove surface impurities.

7. The method of claim 1, wherein the build surface comprises a surface curved in at least one dimension.

* * * * *